US007155907B2

(12) United States Patent
Desjardins et al.

(10) Patent No.: US 7,155,907 B2
(45) Date of Patent: Jan. 2, 2007

(54) ELECTRO-HYDRAULIC FAN DRIVE COOLING AND STEERING SYSTEM FOR VEHICLE

(76) Inventors: Yvon Clarence Desjardins, 1469, Bois de Boulogne, Chicoutimi, Quebec (CA) G7J 4J4; Sylvain Raymond Côté, 1090 rue de la Moisson, Laterrère, Quebec (CA) G7N 1G4; Phillippe Louis Doutre, P.O. Box 99, Mallorytown, Ontario (CA) K0E 1R0; James Edward Yetter, 8 Thicket Road, Etobicoke, Ontario (CA) M9C 2T3

( * ) Notice: Subject to any disclaimer, the term of this patent is extended or adjusted under 35 U.S.C. 154(b) by 94 days.

(21) Appl. No.: 11/085,993

(22) Filed: Mar. 22, 2005

(65) Prior Publication Data

US 2005/0217260 A1    Oct. 6, 2005

Related U.S. Application Data

(60) Provisional application No. 60/555,319, filed on Mar. 23, 2004.

(51) Int. Cl.
*F16D 31/02* (2006.01)
(52) U.S. Cl. ............................. 60/420; 60/489; 60/329
(58) Field of Classification Search ................. 60/420, 60/445, 456, 486, 403, 329, 419, 484, 468
See application file for complete search history.

(56) References Cited

U.S. PATENT DOCUMENTS

| 4,036,432 | A | * | 7/1977 | George | ........................ 60/445 |
|---|---|---|---|---|---|
| 4,179,888 | A | | 12/1979 | Goscenski, Jr. | |
| 4,223,646 | A | * | 9/1980 | Kinder | ........................ 60/329 |
| 4,343,151 | A | | 8/1982 | Lorimor | |
| 4,738,330 | A | | 4/1988 | Suzuki et al. | |
| 4,794,883 | A | | 1/1989 | Fukami et al. | |
| 4,798,050 | A | | 1/1989 | Nakamura et al. | |

(Continued)

OTHER PUBLICATIONS

Development of the Electronically Controlled Hydraulic Cooling Fan System, by Hamamoto et al/Grad Studies/Research, published at least as early as Jan. 29, 2003.

*Primary Examiner*—Igor Kershteyn
(74) *Attorney, Agent, or Firm*—Harold L. Marquis; George M. Thomas; James W. Kayden

(57) ABSTRACT

An electro-hydraulic system for operating a cooling fan and providing hydraulic fluid to a power steering system of the vehicle includes a hydraulic pump unit including first and second fixed displacement pumps and a common drive shaft for these pumps. A hydraulic fluid reservoir is connected to the inlet of each of the pumps. A priority valve is operatively connected to the outlet of the first pump and has an outlet connectible to the power steering system. This valve also has a second outlet connectible to a hydraulic motor for the cooling fan. This valve is arranged to provide a constant flow of hydraulic fluid to the power steering system. A hydraulic line connects an outlet of the second pump to the hydraulic motor. Hydraulic fluid flow through this line is combined with hydraulic fluid flow from the first pump to drive the motor. An electro-hydraulic proportional control valve has an inlet connected to the aforementioned line and an outlet connectible to the reservoir inlet and this control valve controls and limits the rotational speed of the motor. An electronic control device electrically operates and controls the control valve during use of the system.

26 Claims, 10 Drawing Sheets

U.S. PATENT DOCUMENTS

| | | |
|---|---|---|
| 5,531,190 A | 7/1996 | Mork |
| 5,802,848 A | 9/1998 | McClendon et al. |
| 5,875,630 A | 3/1999 | Walsh et al. |
| 5,943,861 A * | 8/1999 | Davison et al. ............... 60/453 |
| 5,946,911 A | 9/1999 | Buschur et al. |
| 5,950,431 A | 9/1999 | Oogushi |
| 6,016,657 A | 1/2000 | Buschur |
| 6,030,314 A * | 2/2000 | Brooks et al. ................ 477/92 |
| 6,463,893 B1 | 10/2002 | Foster et al. |
| 6,629,411 B1 | 10/2003 | Buscher et al. |
| 6,681,568 B1 | 1/2004 | Smith |

\* cited by examiner

ELECTRO-HYDRAULIC FAN DRIVE COOLING AND STEERING SYSTEM FOR VEHICLE

PRIOR APPLICATION

This application is based in part on and claims priority on the basis of earlier filed U.S. Provisional Patent Application Ser. No. 60/555,319 filed Mar. 23, 2004.

BACKGROUND OF THE INVENTION

This invention relates to hydraulic and electro-hydraulic systems for vehicles and, in particular, to an electro-hydraulic system for driving a cooling fan motor and operating a power steering system.

A variety of drive systems are known in the vehicle manufacturing industry for driving a cooling fan used to cool a vehicle engine. For example, hydro-mechanical systems have been developed and provided for large vehicles such as buses. However, these systems consume a high engine horsepower to drive the hydraulic system making the fuel consumption relatively high.

Electro-hydraulic systems to operate a cooling fan in a vehicle and to operate other vehicle systems have also been proposed in the past. An advantage of such a system to operate a cooling fan for a diesel engine is that it can produce a more constant RPM of the fan on demand with variable engine RPM. Compared to known hydro-mechanical systems, the advantages of electro-hydraulic systems include optimized energy usage, space and weight reduction, and ease of adjustment of the electronic controls in the field. With an electro-hydraulic system, it should be possible to adjust the input parameters more readily, thus making such a system more compatible with various engines and the fan efficiency performance curve.

U.S. Pat. No. 4,798,050 issued Jan. 17, 1989 to Toyota Jidosha Kabushiki Kaisha et al. describes a hydraulic system for a vehicle which employs a hydraulic tandem pump, including a primary pump for supplying fluid under pressure to a power steering device and a secondary pump for supplying fluid under pressure to a hydraulic motor of an engine cooling fan. The two pumps are mounted on a common drive shaft for rotation therewith. The control system for the tandem pump includes an electrically operated flow control valve disposed within a communication passage between the secondary pump and the hydraulic motor to bypass fluid under pressure discharged from the secondary pump into an inlet passage connecting a fluid reservoir to the secondary pump. A temperature sensor is arranged to detect an ambient temperature of a prime engine of the vehicle for producing a signal indicative of this temperature. An electrical control apparatus is connected to this sensor to control a current applied to the control valve in response to the output signal from the sensor.

U.S. Pat. No. 5,875,630 issued Mar. 2, 1999 to Sauer Inc. describes a hydraulic drive assembly employing a variable displacement pump connected in a closed loop circuit with a motor that can be used to drive a fan. An auxiliary pump can be operatively connected to the first mentioned pump, the motor and a reservoir for replenishing fluid losses in the closed loop circuit. In a second version of this hydraulic drive assembly, the steering system pump is mounted on the cooling system pump and uses the same input shaft. An indicated advantage of such an integrated package is that it can save space and simplify the drive connections from the engine. One disadvantage of this known hydraulic drive assembly is that it does use a variable displacement pump which generally speaking is more expensive than and heavier than a fixed displacement pump.

It is an object of the present invention to provide an improved electro-hydraulic system for operating a vehicle cooling fan and for providing hydraulic fluid to a power steering system of the vehicle, which system can be manufactured at a reasonable cost and may produce a more constant RPM of the cooling fan on demand with a variable engine RPM.

SUMMARY OF THE INVENTION

According to one aspect of the invention, there is provided an electro-hydraulic system for operating a hydraulic motor for a vehicle cooling fan and providing pressurized hydraulic fluid to a power steering system of the vehicle, this system including a hydraulic pump unit, including at least first and second fixed displacement pumps and a common drive shaft to drive each of the pumps. A hydraulic fluid reservoir is fluidly connected to at least one inlet of the pumps and capable of providing sufficient hydraulic fluid for operation of the pumps. An electro-hydraulic drive circuit is adapted for hydraulic fluid connection to the hydraulic motor for operating the cooling fan. The drive circuit includes an electro-hydraulic proportional control valve operatively connectible to the pump unit for controlling and limiting the operational speed of the motor. There is also a priority valve for providing a constant flow of hydraulic fluid to the power steering system during operation of the electro-hydraulic system. The operation of the priority valve is controlled by hydraulic pressure in the fan drive circuit during use of the fan drive circuit. The proportional control valve is adapted for electrical connection to an electronic control device capable of electrically operating and controlling the proportional control valve from predetermined input variables, including at least one temperature variable. The control device is capable of calculating an appropriate speed for the cooling fan. The control device is also able to generate electrical control signals based on this calculation and to transmit these signals to the proportional control valve in order to direct the cooling fan towards a more appropriate speed for cooling. The priority valve is arranged to divert excess flow of hydraulic fluid, if any, from the pump unit so that the excess flow is combined with hydraulic fluid flow from the second pump in order to drive the hydraulic motor and operate the fan.

In a preferred embodiment of this electro-hydraulic system, the reservoir is pressurized during use and is mounted with an integrated hydraulic circuit block that incorporates hydraulic valves for the system.

According to another aspect of the invention, there is provided an electro-hydraulic system for operating a vehicle cooling fan and providing pressurized hydraulic fluid to a power steering circuit. The electro-hydraulic system comprises a hydraulic pump arrangement having at least first and second fixed displacement pumps, each having a fluid inlet and a fluid outlet, and a drive shaft connectible to a power source and connected to drive the pumps. A hydraulic fluid reservoir is fluidly connected to the inlets of the pumps and capable of containing and providing sufficient hydraulic fluid for operation of the pumps. There is an electro-hydraulic drive circuit for hydraulic fluid connection to the pump arrangement, a hydraulic motor, a power steering circuit. The drive circuit includes an electro-hydraulic proportional control valve operatively connected to the second pump for controlling and limiting the operation of the hydraulic motor. There is also included a priority valve for providing a constant flow of hydraulic fluid to the power steering circuit. The operation of the priority valve is controlled by hydraulic pressure in the drive circuit during use of the system. The proportional control valve is adapted for electrical connection to an electronic control device capable of electrically operating and controlling the proportional control valve from predetermined input variables readable by the control device, these variables including at least one temperature variable, the control device being capable of calculating an appropriate cooling fan speed, generating electrical control signals based on the calculations, and transmitting these control signals to the proportional control valve in order to direct the cooling fan towards a more appropriate speed for cooling. During use of the system, the priority valve returns any excess flow of hydraulic fluid over the flow required by the power steering system to the fluid reservoir.

Further features and advantages will become apparent from the following detailed description taken in conjunction with the accompanying drawings.

DETAILED DESCRIPTION OF PREFERRED EMBODIMENTS

Figure 1:
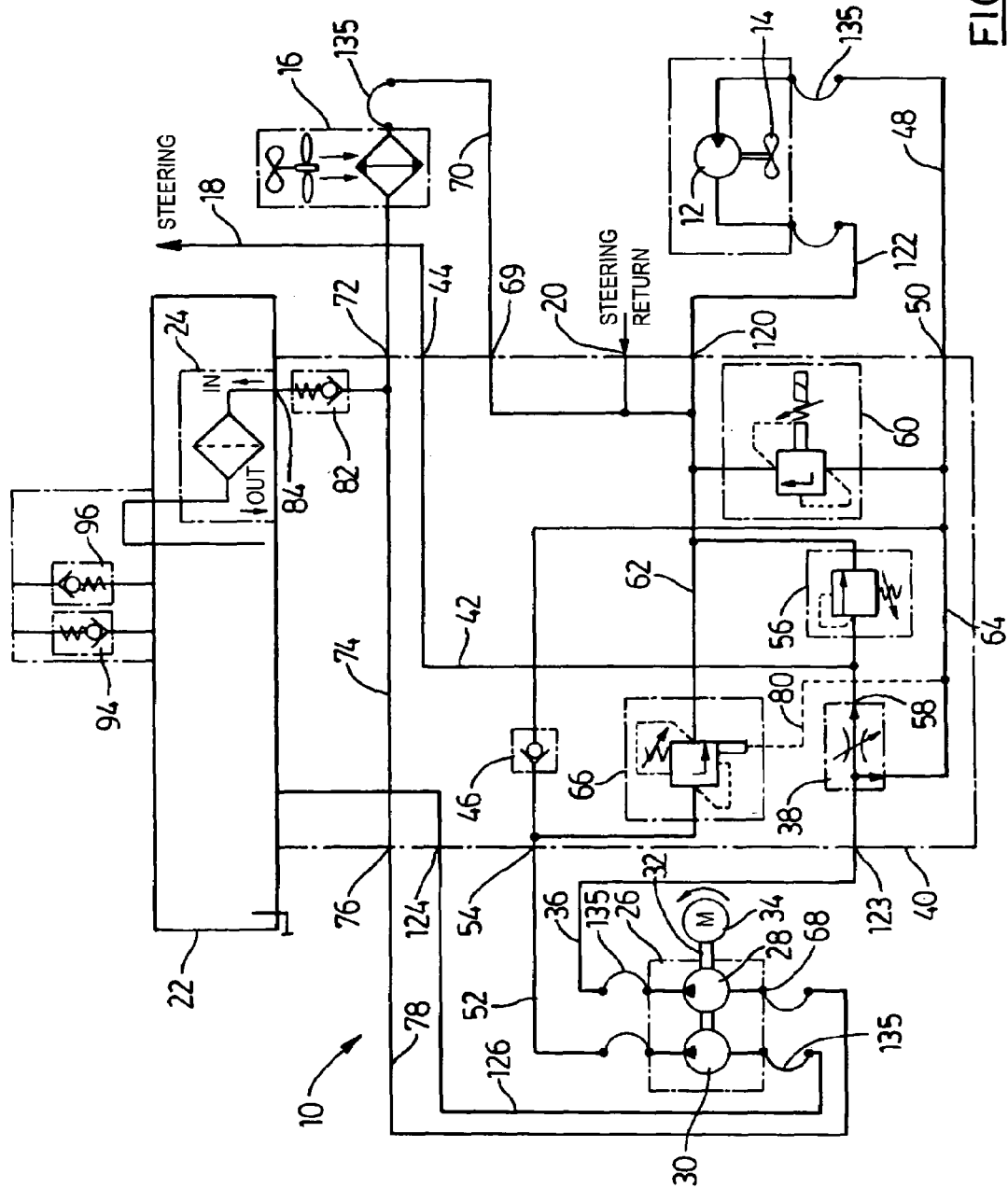
FIG. 1 is a schematic illustration of a preferred hydraulic circuit constructed according to the invention, this view also including the cooling fan, the hydraulic motor for rotating same and a vehicle cooler unit.

FIG. 1 illustrates schematically a hydraulic circuit 10 that can be used to provide a preferred version of an electro-hydraulic system according to the invention. Included in FIG. 1 are known vehicle components that can be attached to this hydraulic circuit, for example, standard components found on a vehicle such as a bus or truck. These components include a hydraulic fan motor 12, a standard cooling fan 14 connected thereto, and a cooler unit 16. Although not shown in FIG. 1, it will also be understood that the hydraulic circuit 10 in use is connected to a power steering unit, the inlet of which can be connected to hydraulic line 18. The outlet of the power steering unit is connected to the hydraulic circuit 10 at connection point 20.

Before discussing the major components of the hydraulic circuit in detail, there will now be provided a general outline of this hydraulic circuit and an explanation of how the major components interact with one another. Shown at the top of FIG. 1 schematically, is a hydraulic fluid reservoir 22 and a preferred version of this reservoir is shown in detail in FIGS. 2 and 3. Preferably, there is mounted inside the reservoir an in-tank filter 24 through which the returning hydraulic fluid must pass in order to ensure that the fluid is maintained in a clean condition. The preferred reservoir is pressurized and sealed as explained further hereinafter.

Figure 6:
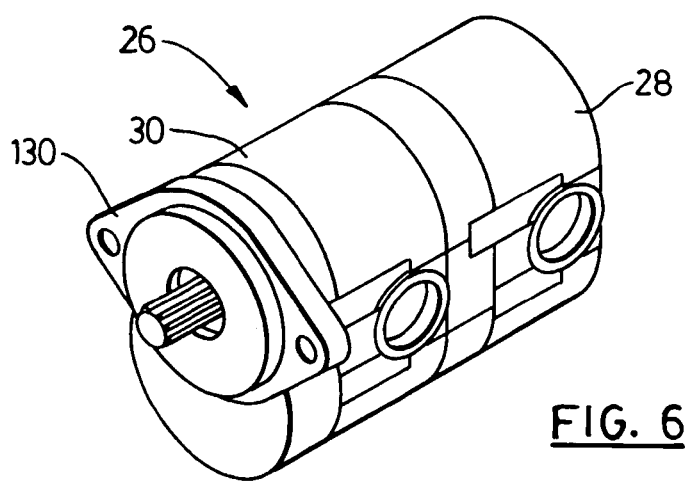
FIG. 6 is a perspective view of a tandem pump unit that can be used in the hydraulic circuit of FIG. 1.

The outlet of the reservoir is connected to a tandem or double pump unit 26 which can be of standard construction. This hydraulic pump unit includes a first fixed displacement pump 28 and a second fixed displacement pump 30. It will be appreciated that the advantages of a fixed displacement pump as compared to a variable displacement pump used in other known systems include the lower cost of the fixed displacement pump and the fact that it can generally be made smaller and therefore is generally lighter. The two pumps are driven by a common drive shaft 32 that can be driven by the existing main motor 34 of the vehicle. This main motor can, for example, be a diesel engine such as one commonly used in a bus or truck. It will be understood that shaft 32 rotates a pump gear in each of the pumps. A standard double hydraulic pump unit that can be used in a system of the invention is illustrated in FIG. 6. Although the first and second pumps could possibly be pumps of the same size and displacement, in a preferred embodiment of the present system, one of the pumps has a larger displacement than the other and, in particular, in the illustrated hydraulic circuit, the pump 28 is substantially larger than the second pump 30. The sizes of the pumps actually used will vary and depend on the power requirements of the hydraulic system including the fan motor. Accordingly, for purposes of the following discussion, the first pump 28 will sometimes be referred to herein as the larger pump while the second pump 30 shall sometimes be referred to as the smaller pump.

Figure 2:
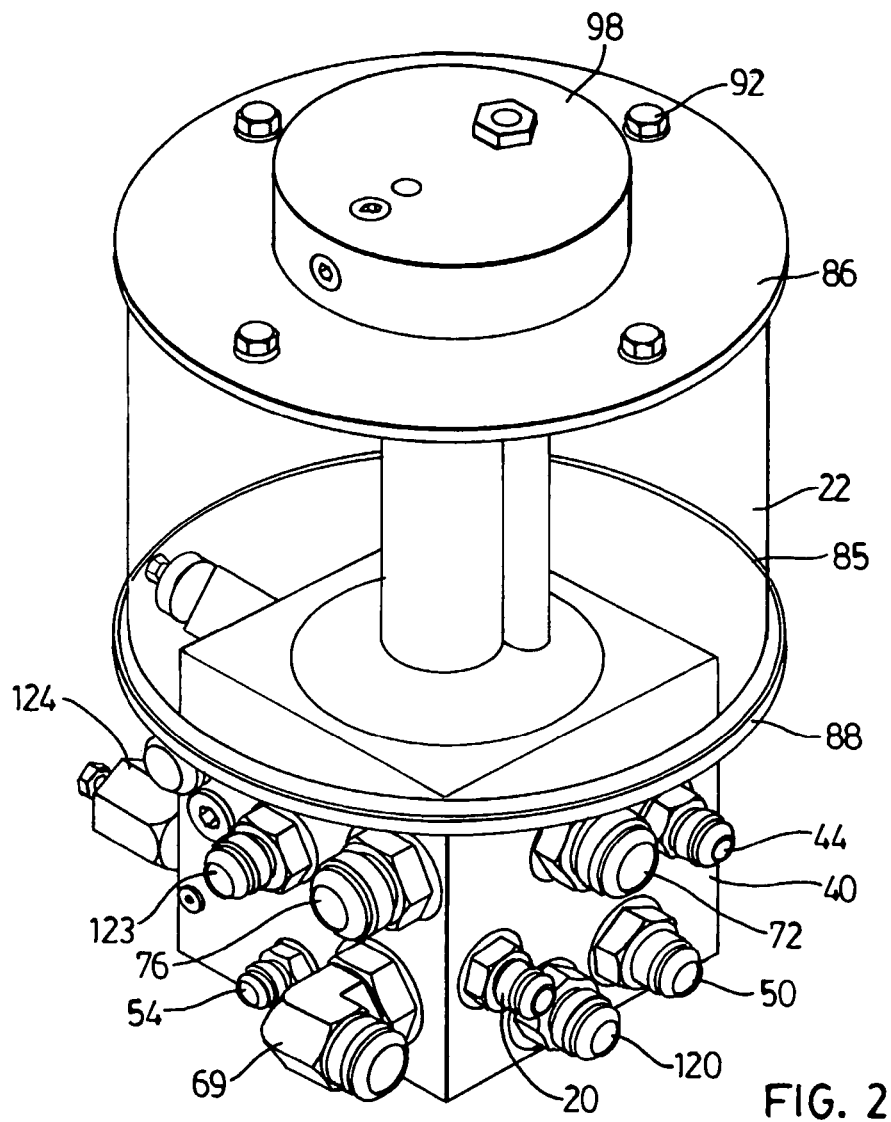
FIG. 2 is a perspective view of one form of reservoir and integrated hydraulic circuit block that can be used in the electro-hydraulic system of the invention.
Figure 3:
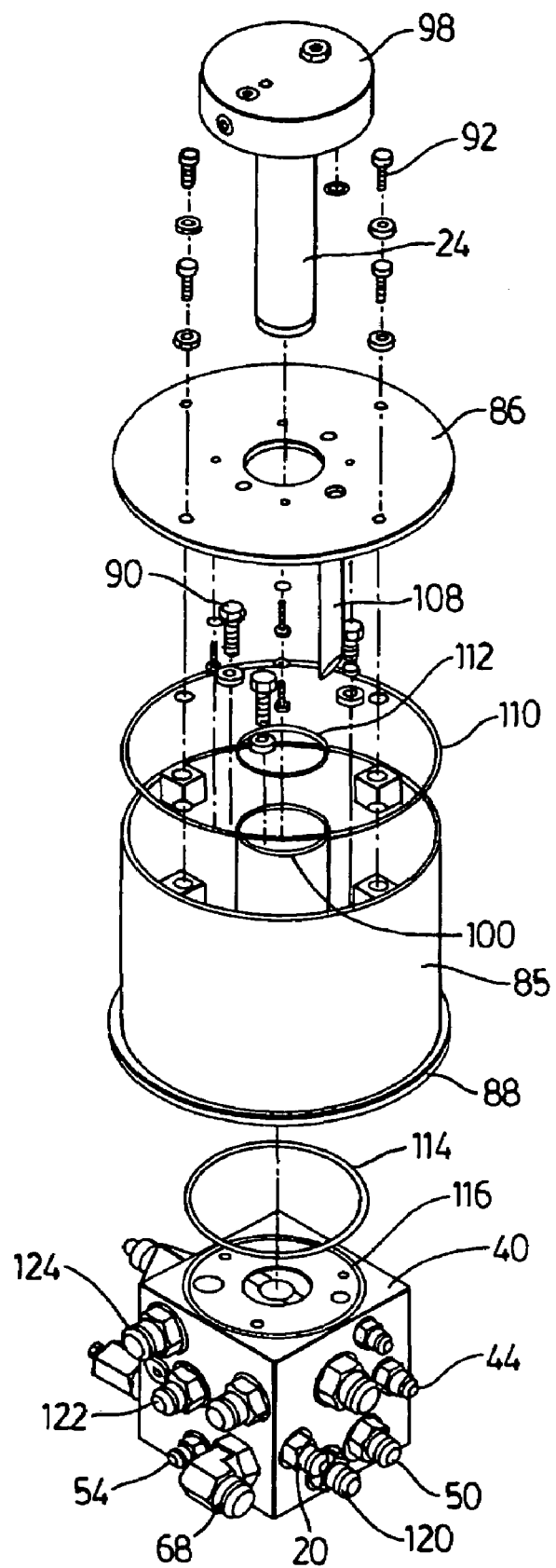
FIG. 3 is an exploded view showing separately the various components which make up the reservoir and integrated hydraulic circuit block of FIG. 2.
Figure 4:
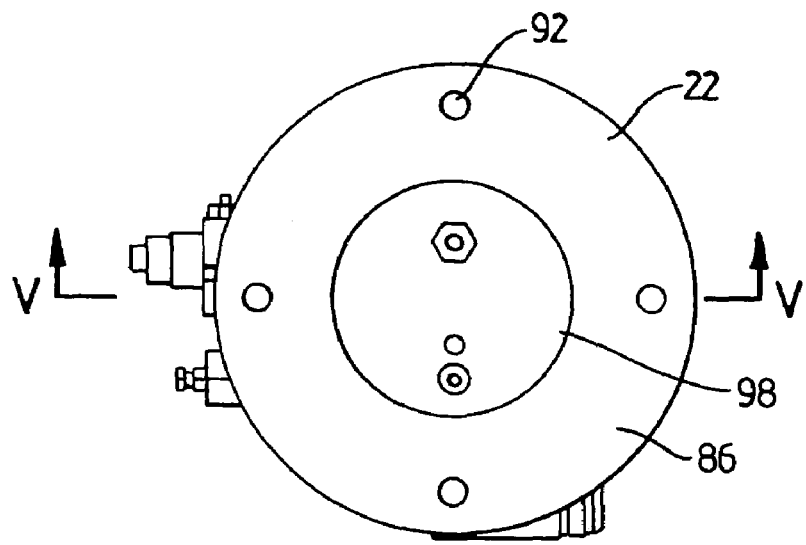
FIG. 4 is a top view of the reservoir and integrated hydraulic circuit block of FIG. 2.
Figure 5:
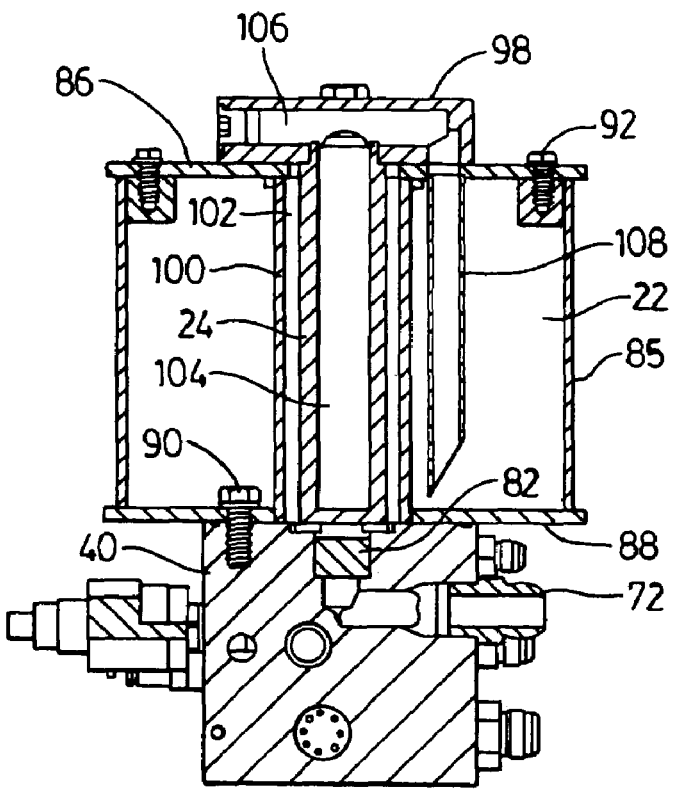
FIG. 5 is a vertical cross-section of the reservoir and the integrated hydraulic circuit block, this view being taken along the line V—V of FIG. 4.

The first or larger pump 28 is connected by hydraulic line 36 to a priority valve 38. This valve can be installed in and be part of a manifold block or integrated hydraulic circuit block indicated generally at 40 and outlined by a dot-dash line in FIG. 1. As illustrated in FIGS. 2 and 5, in a particularly preferred version of the present hydraulic system, the reservoir 22 is mounted to the manifold block. The manifold block preferably incorporates most or all of the hydraulic valves used in the hydraulic circuit 10.

The priority valve 38 is selected to provide a constant flow of hydraulic fluid through a passageway 42 and out of port 44 to the power steering unit of the vehicle. With respect to the operation of the standard priority valve 38, it will be appreciated that the operation of this valve is automatic and is controlled by hydraulic pressure. The priority valve measures the difference in pressure and compares it to the value of a spring mounted in the valve. In this way it is able to limit the fluid flow to the power steering system. The hydraulic line 18 is connected to the port 44 of the manifold block. Any excess flow from the large pump 28 is then combined with the flow from the smaller pump 30 which flows through a check valve 46. The combined flow is used to drive the fan motor 12 via hydraulic line 48 which is connected to port 50 of the manifold block. The outlet of the smaller pump is connected via hydraulic line 52 to a port 54 of the block.

In order to protect the power steering system, there is preferably provided in the manifold block a pressure relief valve 56 which can be of standard construction. This valve is connected to a second outlet 58 of the priority valve 38. It is also connected to the passageway 42 that delivers hydraulic fluid to the power steering system. The maximum pressure at which the valve 56 provides relief varies depending upon the particular power steering unit to be connected to the manifold block. In one particular embodiment it is a standard valve sold under valve number DVPA-RV-1-10-SM HTF.

The speed of the hydraulic fan motor 12 is controlled and limited by an electro-hydraulic proportional control valve 60. This solenoid-operated valve is connected in a passageway in the manifold block that extends between a passageway 62 and a passageway 64, the latter being connected to the outlet port 50. The proportional control valve 60 can be a standard valve of this type. In one particular version of this system, the valve is sold by Bucher under valve No. DVPA-125-10-2-24 VDC HTF. The valve 60 is controlled and operated by a programmed electronic controller 170 which is illustrated schematically in FIG. 12 and measures variables from the vehicle to determine the appropriate fan speed to optimize cooling capability as explained further hereinafter. The controller is connected to the terminals of the solenoid indicated by S+ and S− in FIG. 12. Instead of a separate or dedicated electronic controller, the electronic controller can be incorporated into or part of another form of electronic control such as an engine control module (ECM) for the vehicle.

When the combined hydraulic fluid flow from the two pumps exceeds the requirements of the hydraulic motor 12, an unloading valve 66 is then used to divert the fluid flow from the smaller pump 30 to the inlet 68 of the larger pump 28. The unloading valve 66 can also be a standard valve such as that sold by Bucher under valve No. DWPAU-2-10-SM15-2 HTF. The diverted flow passes through the passageway 62 and out of manifold block port 69. The fluid flow then goes through hydraulic line 70 connected to the inlet of the cooler unit 16 and then it enters the manifold block through inlet 72. The hydraulic fluid can then flow through passageway 74 of the block, out through block port 76 and then through hydraulic line 78 to the inlet of the pump 28. It will be understood that the unloading valve 66 is operated by hydraulic pressure feedback from the fan motor through the line 48 and passageway 80 indicated in dash line in FIG. 1. The valve 66 is a normally closed valve that is moved to the open position by the pressure feedback. It will be understood that any excess fluid flow diverted by the valve 60 is directed to the outlet port 69 and flows through the cooler 16 and through the circuit loop.

The charging or supercharging effect of the hydraulic fluid flow from the smaller pump 30 is limited by a suction relief valve 82 which is mounted in the manifold block between the passageway 74 and outlet port 84 in the top of the manifold block. Thus, the excess return flow through the valve 82 is filtered by the in-tank filter 24.

Turning now to the construction of the reservoir 22 and the intake filter 24 as illustrated in FIGS. 2, 3 and 4 to 5, the reservoir has a cylindrical shape having a cylindrical sidewall 85, a round top 86 with a central hole formed therein, and a round bottom 88 which also has a central opening. The round bottom can be attached by screws 90 to the top of the manifold block 40. The top 86 can be attached by four screws 92 to the top of the cylindrical sidewall 85 as shown. Although FIG. 2 shows the cylindrical sidewall 85 as transparent for purposes of illustration, it is preferably made of a suitable metal such as stainless steel and this metal must be sufficiently thick and strong to withstand the pressure in the reservoir, for example, $\frac{1}{8}^{th}$ inch thick. One form of this reservoir has its sidewall constructed from a section of stainless steel pipe. The capacity of the reservoir can vary and depends upon the particular requirements of the hydraulic system. Typically, its size can range between 1 and 5 gallons. The factors that would affect the size of the reservoir include the power required for the fan drive system and the speed of operation of the tandem pump unit 26. With respect to the amount of the pressure, in one preferred embodiment, the maximum pressure in the reservoir is 5 psig but the pressure in the reservoir can range from a pressure above atmospheric to a maximum not exceeding 10 psig. Advantages of pressurizing the reservoir arise from the fact that it is a sealed reservoir which prevents contamination from entering the hydraulic fluid and the pressure in the reservoir aids pump suction. The pressure in the reservoir is limited or controlled by a pressure limiting valve 94 shown schematically in FIG. 1. There is also preferably provided a vacuum break valve 96 that prevents a suction from forming in the reservoir. Both of these valves can be of standard, known construction. These valves can be mounted on top of the reservoir in cylindrical disk 98 shown in FIGS. 2 and 5. It will be understood that the reservoir 22 will always be pressurized upon startup of the vehicle. Initial pressurization is a result of operation of the tandem pump unit 26 and the hydraulic circuit connected thereto. Additional pressurization is created by thermal expansion of the hydraulic fluid to the maximum limit controlled by the valve 94. The reservoir will remain pressurized if it is warmer than the ambient air temperature even after engine shutdown.

With respect to the in tank filter 24, the preferred illustrated filter 24 is cylindrical as shown in FIG. 5 and is coaxial with the reservoir. The filter is contained within a cylindrical filter housing 100 that extends between and is connected to the top 86 of the reservoir and the bottom 88. An annular gap 102 is formed between the exterior of the filter and the housing 100. A central passageway 104 extends through the center of the filter. In one configuration of this filter, the flow of the hydraulic fluid is from the outside of the filter to the inside, that is into the passageway 104. To explain further, after the hydraulic fluid passes upwardly through the suction relief valve 82, it flows into the annular gap 102 from which it then passes inwardly through the filter. The filter fluid then passes upwardly to horizontal passage 106 formed in the disk member 98. The fluid then flows downwardly through return pipe 108 and into the reservoir 22. The fluid flows out of the reservoir through holes (not shown) formed in the bottom 88 and in the top of the manifold block 40. Instead of having the filter mounted within the reservoir, it is also possible to mount the filter in its own housing external of the reservoir. Also, it is possible to mount the reservoir below the manifold block rather than on top of the manifold block (as shown in FIG. 5).

In order for proper sealing of the reservoir, an O-ring seal 110 can be mounted between the top 86 and the top of sidewall 85. An additional O-ring seal 112 can be provided between the top 86 and the top of filter housing 100. Another O-ring seal 114 is provided between the bottom 88 and the manifold block or integrated hydraulic circuit block 40, this seal fitting inside groove 116. The block 40 is preferably made from aluminum which has the advantage of reducing the weight of the system but it is also possible to construct the block from steel.

Also shown in FIG. 2 are a number of the outlets and inlets formed in the block for the passage of the hydraulic fluid, some of which have already been identified above. Shown beside the port 50 is an inlet port 120 which receives fluid flow from the motor 12 through hydraulic line 122. Located above the inlet 69 is the outlet port 76 which is connected to the inlet of the first pump 28. Shown to the left of the port 76 is an inlet port 123 to which the aforementioned hydraulic line 36 is connected. Shown in the upper left corner of the block is an outlet port 124 which is the port connected by hydraulic line 126 to the inlet of the smaller pump 30.

The hydraulic fluid that can be used in the hydraulic system of the invention includes any of the standard types of hydraulic fluid as well as automatic transmission fluid.

With reference to the particular double pump unit 26 shown in FIG. 6, the pump can have a mounting flange 130 at one end. The double pump can be mounted at one of several different possible locations on the vehicle. It can, for example, be mounted so as to be driven from a belt drive powered by the engine like an accessory. The pump can also be mounted on the back side of an air compressor in the vehicle or it can be mounted to a power takeoff (PTO).

With respect to the unloading valve 66, this valve and other standard valves used in the integrated hydraulic circuit are preferably screw in cartridge valves. These valves are mounted in the manifold block 40 by boring a suitable cavity in the block and then forming threads in the cavity.

With respect to the existing cooler 16 that can be connected to the hydraulic system of the invention, this cooler can serve several different functions, including cooling the charged air of the vehicle and the engine coolant. It can also be used to cool the hydraulic fluid itself and also possibly transmission coolant. Because the cooler can serve these different functions, parts of the cooler may operate at all times as required while other parts can be shut down by the control system of the vehicle. As illustrated, all of the hydraulic fluid flow in the hydraulic circuit 10 flows through the cooler unit 16 by means of the hydraulic line 70 but it is also possible to construct a hydraulic circuit in accordance with this invention whose only part of the hydraulic fluid flow in the circuit passes through the cooler 16.

Figure 7:
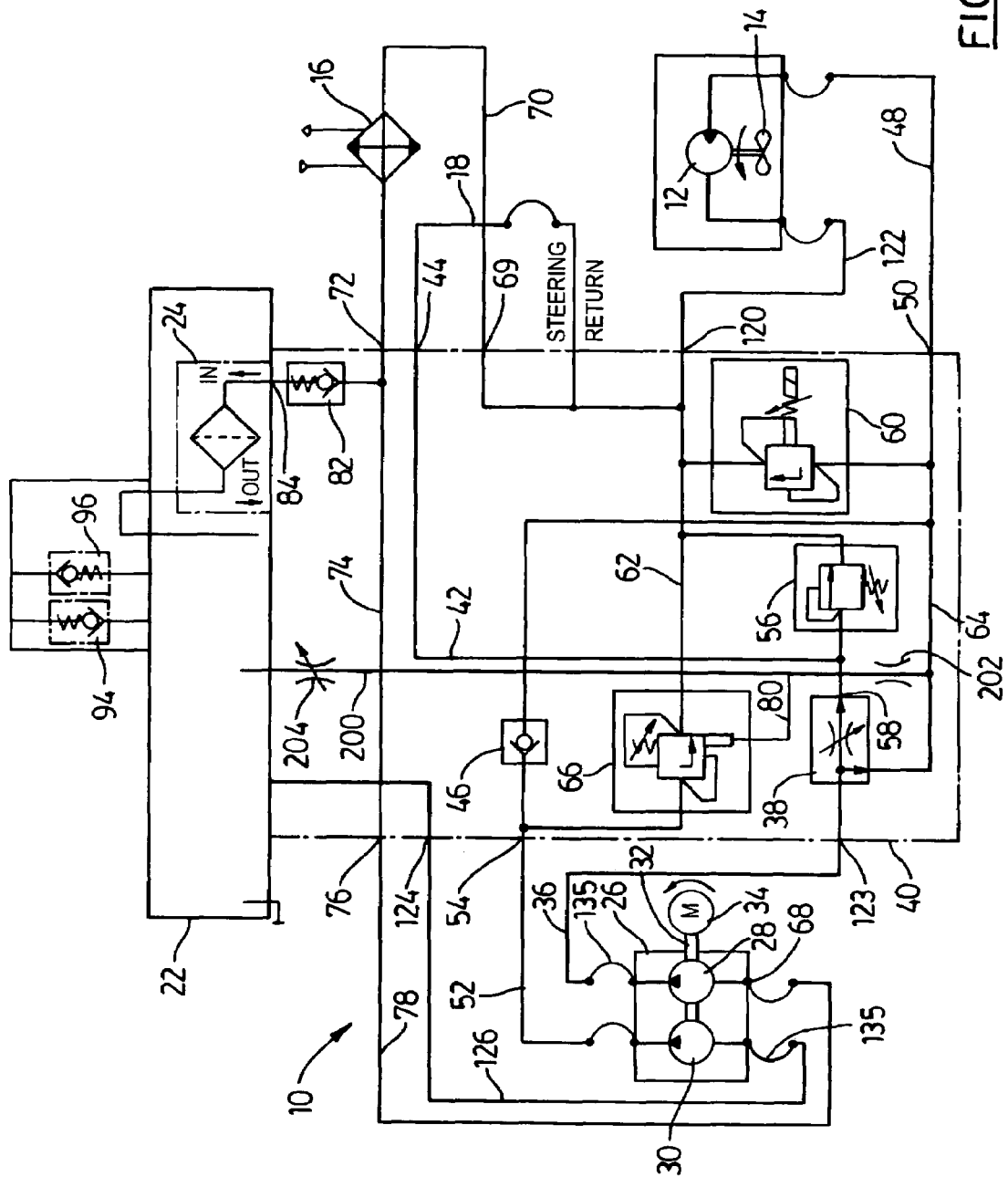
FIG. 7 is a schematic illustration of a variation of the hydraulic circuit of FIG. 1, this variation also being shown connected to a hydraulic motor for a fan.

FIG. 7 illustrates a minor variation of the hydraulic circuit of FIG. 1 and as will be seen by a comparison of the two figures, the two hydraulic circuits have many features and components in common. The same reference numerals have been used to identify the same features and components in FIG. 7 and only those features which differ from the hydraulic circuit of FIG. 1 will now be described. In the FIG. 7 circuit, there is a hydraulic fluid line or passage 200 which extends between the passage 64 and the reservoir 22. Depending upon the construction of and characteristics of the unloading valve 66, the line 200 can be desirable to provide stability in the hydraulic circuit and dampen the operation of the unloading valve 66. Arranged in the line 200, there can be a non-temperature compensated flow restrictor 202 which can be arranged near the junction with line 64. In addition, near the reservoir 22, there can be arranged another non-temperature compensated variable flow restrictor 204. The restrictor 204 can be mounted in the manifold block, if desired.

As in the hydraulic circuit of FIG. 1, the hydraulic circuit of FIG. 7 also has a passageway 80 that extends to the unloading valve 66. However, in the circuit of FIG. 7, the line 80 extends between the passage 200 and the unloading valve. As explained above, the unloading valve 66 is operated by hydraulic pressure feedback from the fan motor through the line 48 and the passage 80.

A further minor difference between the circuits of FIGS. 1 and 7 relates to the manner of operation of the in-tank filter 24. A different type of filter is used in the circuit of FIG. 7, this filter having an inside-to-outside flow. This type of filter may be less expensive to use in the present system than the type of filter described above in connection with the embodiment of FIG. 1. It is also possible to mount an inside-to-outside flow filter outside the fluid reservoir in its own filter housing. In the embodiment of FIG. 1, the outlet line from the filter 24 is shown as extending upwardly out of the reservoir and then extending back down into the reservoir, while this is not the case with the outlet line from the filter of the FIG. 7 circuit.

Figure 8:
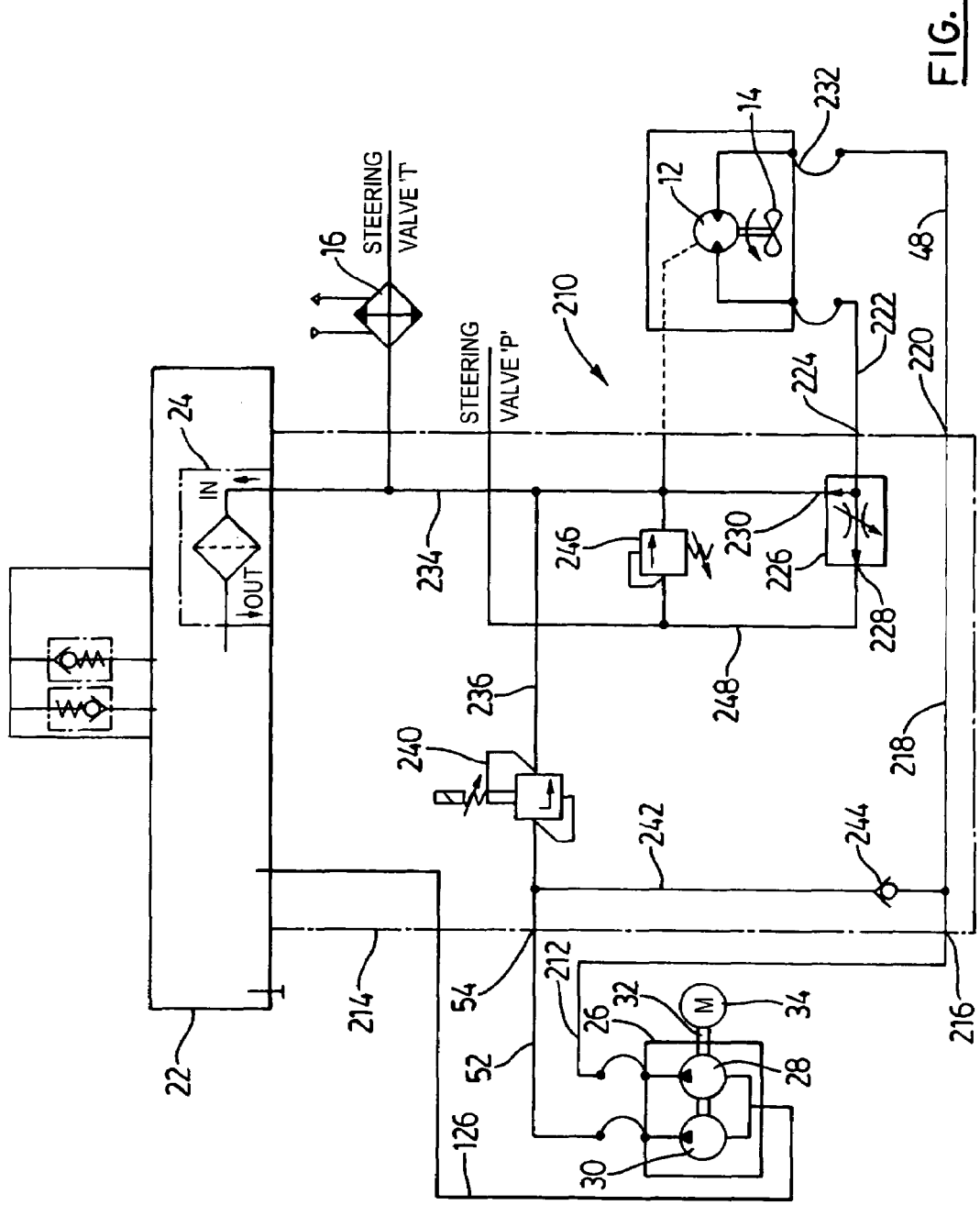
FIG. 8 is a schematic illustration of another embodiment of a hydraulic circuit, this view also showing the cooling fan, the hydraulic motor for rotating same, and a vehicle cooler unit.

Turning now to the hydraulic circuit of FIG. 8, this circuit is indicated generally by reference 210. Again, the hydraulic circuit 210 has some features and components in common with the hydraulic circuit 10 of FIG. 1 and the same reference numerals are used to identify the same or similar features and components. Those features which differ from the hydraulic circuit and components of FIG. 1 will now be described. The in-tank filter 24 of this circuit is illustrated as being similar to that used in the circuit of FIG. 7 but it will be appreciated that it could be constructed in the same manner as the filter of the FIG. 1 circuit.

In the hydraulic circuit 210, the outlet of the reservoir is connected to a tandem or double pump unit 26 that has first and second fixed displacement pumps 28 and 30 driven by the common drive shaft 32. The first pump 28 is connected by a hydraulic line 212 that is connected to the manifold block 214 at inlet port 216. A straight hydraulic fluid passage 218 extends through the block to an outlet port 220. The hydraulic line 48 connects the port 220 to the inlet of the hydraulic motor 12. The outlet of the hydraulic motor 12 is connected by hydraulic line 222 to an inlet port at 224 of the manifold block.

The electro-hydraulic drive circuit 210 has a priority valve 226 mounted in the manifold block with its inlet operatively connected to the line 222. As in the embodiment of FIG. 1, this priority valve provides a constant flow of hydraulic fluid to the power steering system. The operation of the priority valve is controlled by hydraulic pressure in the fan drive circuit during use of the electro-hydraulic system. The priority valve 226 is arranged to divert an excess flow of hydraulic fluid, if any, from the double pump unit 26 so that the excess flow is combined with the regular hydraulic fluid flow to the two pumps 28 and 30 in order to drive the hydraulic motor 12 and operate the fan 14. It should be noted that in the hydraulic circuit 210, the hydraulic line 126 providing hydraulic fluid from the pressurized reservoir 22 is connected to the inlets of both the first and second pumps 28, 30.

The priority valve 226 has a first outlet 228 which is connected or connectible to the power steering system which, it will be understood, can be of standard construction and is not per se part of the electro-hydraulic system of the invention. The priority valve also has a second outlet at 230 which is connected or connectible to the inlet of the reservoir 22. The outlet 230 is connected to the reservoir by fluid passage 234 which is connected to interconnecting fluid passage 236 located in the manifold block. The passage 236 is connected to the outlet of the electro-hydraulic proportional control valve 240. The inlet of the valve 240 is connected to fluid passage 242 located in the manifold block. The passage 242 is connected by means of hydraulic line 52 and inlet port 54 to the outlet of the second pump 30. The proportional control valve 240 is operatively connected to the second pump 30 so that it is able to control and limit the operational speed of the hydraulic motor. It will be understood that an electronic controller, similar to the controller 170 described hereinafter, electrically operates and controls the proportional control valve 240 from predetermined input variables readable by the controller, these variables including at least one temperature variable. The controller is capable of calculating an appropriate cooling fan speed, generating electrical control signals based on this calculation, and transmitting control signals to the proportional control valve in order to direct the cooling fan towards a more appropriate speed for cooling.

A check valve 244 is provided in the line 242 to ensure one way flow of hydraulic fluid in the direction of the hydraulic motor. Also, in order to protect the power steering system, there is preferably provided in the manifold block the pressure relief valve 246 which can be mounted between and connected to fluid lines 248 and 234 in the manifold block. Again, the maximum pressure at which the valve 246 provides relief depends upon the particular power steering unit to be connected to the manifold block.

It will be understood by those skilled in the construction of hydraulic circuits for vehicles that the hydraulic circuit 210 can be constructed at a lower cost than the circuit 10 of FIG. 1 because it is simpler and has fewer components. Another advantage of this simpler circuit is that there is no parasitic loss on the steering circuit. The hydraulic circuit 210 can be used effectively where the required hydraulic hoses used with the system are no more than eight feet long.

As in the first circuit, both the first and second pumps are always being turned by the common drive shaft. However, in the circuit 210, the first pump 28 runs under load all the time to provide the required pressurized hydraulic fluid to the fan motor 12. However, the load on the pump 30 is turned on or off by the proportional control valve 240.

Figure 9:
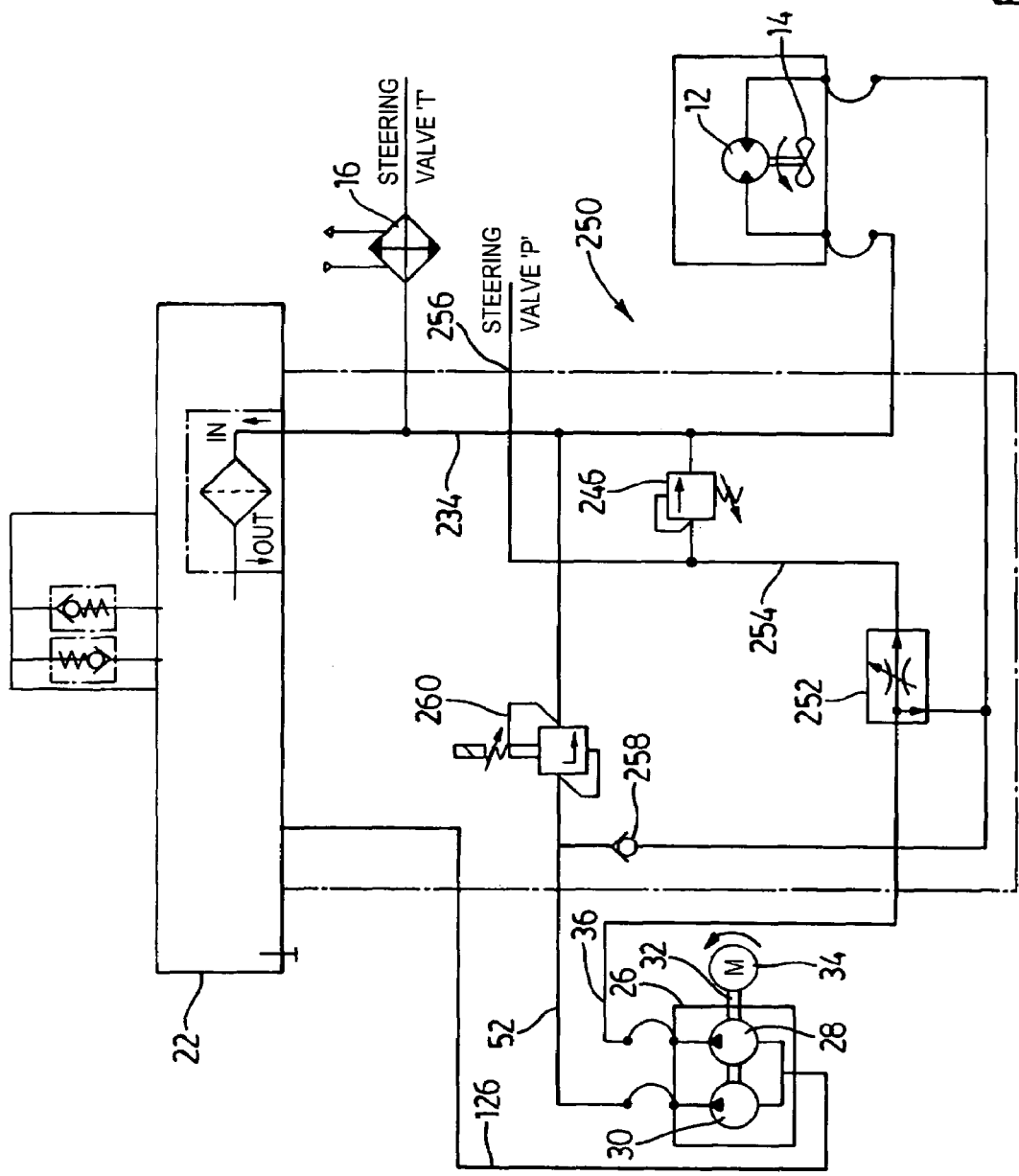
FIG. 9 is a schematic illustration of a further hydraulic circuit where the location of the priority valve is between one pump and the hydraulic motor.

Turning now to the electro-hydraulic system of FIG. 9, this hydraulic circuit 250 is similar to the hydraulic circuit 210 of FIG. 8 with the primary difference being the location of the priority valve 252. Again, the same reference number numerals have generally been used to identify the same features and components. The outlet of the reservoir 22 is again connected to the tandem or double pump unit 26 which includes first and second fixed displacement pumps 28, 30. The connecting hydraulic line 126 provides hydraulic fluid to both inlets of the pumps 28, 30. The first pump 28 (as in the embodiment of FIG. 1) is connected by the hydraulic line 36 to the priority valve 252 which is installed in the manifold block. The priority valve 252 provides a constant flow of hydraulic fluid through fluid passageway 254 and through port 256 to the power steering unit of the vehicle. As with the other priority valves, the operation of the valve 252 is automatic and is controlled by hydraulic pressure. Any excess flow from the first pump 28 is combined with flow from the second pump 30 which flows through a check valve at 258.

In order to protect the power steering system, there is preferably provided in the manifold block the pressure relief valve 246 which can be of standard construction. In the circuit 250, the valve 246 is connected between the fluid passageway 254 and the passageway 234.

The speed of the hydraulic fan motor 12 is controlled and limited by an electro-hydraulic proportional control valve 260 which operates and functions in a manner similar to the valve 240 in the hydraulic circuit 210. It will be understood that an electronic controller similar to the electronic controller 170 described hereinafter electrically operates and controls the proportional control valve 260 from predetermined input variables readable by this controller, these variables including at least one temperature variable. The controller is capable of calculating an appropriate cooling fan speed and generating electrical control signals based on this calculation. These signals are transmitted to the valve 260 in order to direct the cooling fan towards a more appropriate speed for cooling.

It will be appreciated that unlike the priority valve of the hydraulic circuit 210, the priority valve 252 is arranged in the fan drive circuit 250 between the first pump 28 and an inlet of the hydraulic motor 12. Both of the manifold blocks used in the fan drive circuits 210 and 250 can be constructed in a similar manner from an aluminum block.

One disadvantage of the fan drive circuit 250 is that there is an energy loss at the priority valve 252 because the cooling fan must always be turning whereas the steering motor in the steering circuit is usually unloaded, that is, it is not being used most of the operating time of the system. This energy loss at the priority valve is also one disadvantage of the fan drive circuit 10 of FIG. 1.

Figure 10:
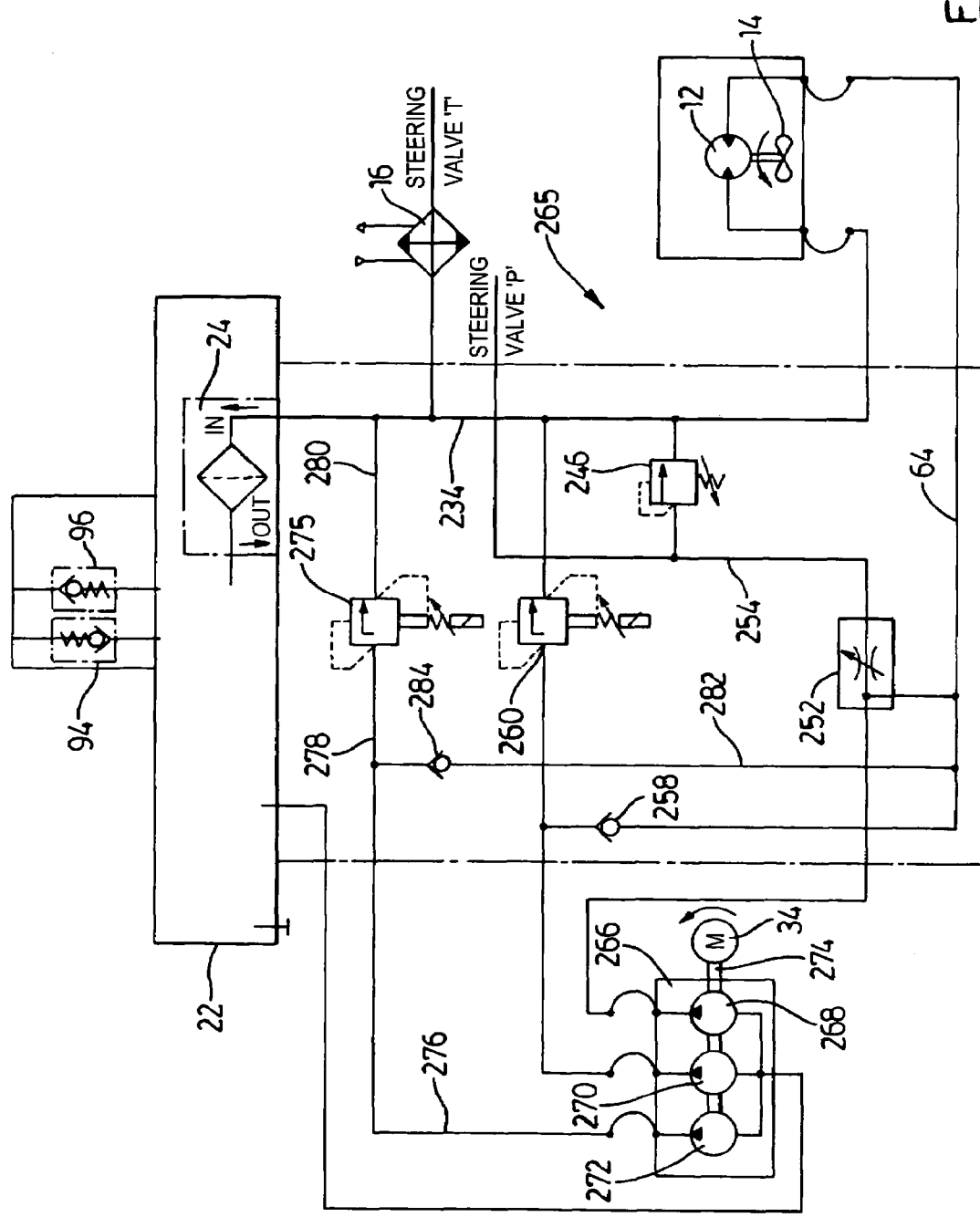
FIG. 10 is a schematic illustration of yet another hydraulic circuit according to this invention, this embodiment employing three pumps mounted on a common drive shaft.

Turning now to the electro-hydraulic system of FIG. 10, this system employs a fan drive circuit 265 which has a number of features and components similar to those found in the fan drive circuit 250 of FIG. 9. The same reference numbers are used generally to identify the same features and components. Those features which differ from the hydraulic circuits and components of FIGS. 1 and 9 will now be described.

Unlike the above described circuits, the outlet of the reservoir 22 is connected to a triple pump unit 266 which includes first, second, and third fixed displacement pumps 268, 270 and 272. The advantage of having a triple pump unit driven by a single drive shaft 274 is that it is capable of providing smaller incremental steps in the speed of the fan 14 and it is thus capable of providing higher efficiency over a wider range of fan speeds. There is, of course, an offsetting cost penalty due to the extra pump 272. Assuming that the three pumps differ in size, typically the largest pump is closest to the motor 34, in this case, the pump 268. However, it is not essential for the largest pump to be pump 268. It will be understood that when using three pumps in this manner, it is possible to provide seven discrete speeds for the fan yet have efficient operation of the pumps. This can, for example, be done by providing three pumps of different sizes. For instance, the smallest pump, which can be the pump 272 might have a displacement size of one unit, the second pump can then have a displacement size of two units and the third pump can have a displacement size of four units. Then by using various combinations of one or more of the pumps to provide hydraulic fluid under pressure seven different fan operational speeds are achievable. The fan drive circuit 265 also has a second electro-hydraulic proportional control valve 275 which is operatively connected to the third pump 272 by means of hydraulic line 276 and fluid passageway 278. Fluid passageway 280 connects the valve 275 to fluid passageway 234 which is connected to the inlet to the filter and reservoir. The line 278 in the manifold block is connected by fluid passageway 282 to fluid passageway 64 which leads to the inlet of the hydraulic motor 12. A second check valve 284 is arranged in the line 282 to ensure one way flow towards the motor. Thus, the proportional control valve 275 is also connected to the reservoir inlet. The electronic controller described hereinafter also electrically operates and controls the proportional control valve 275 from predetermined input variables read by the controller. It will be appreciated that the hydraulic fluid flow, if any, through the proportional control valves 260, 275 is in one direction only, that is towards the fluid line 234 that leads to the reservoir 22. The amount of hydraulic fluid that flows through each of these valves is controlled by the proportional control valve and the electronic controller 170. If the valves 260 and 275 are opened fully, then the hydraulic fluid flow will by-pass the hydraulic motor, thereby reducing its speed and removing the load on the pumps 270 and 272.

Figure 11:
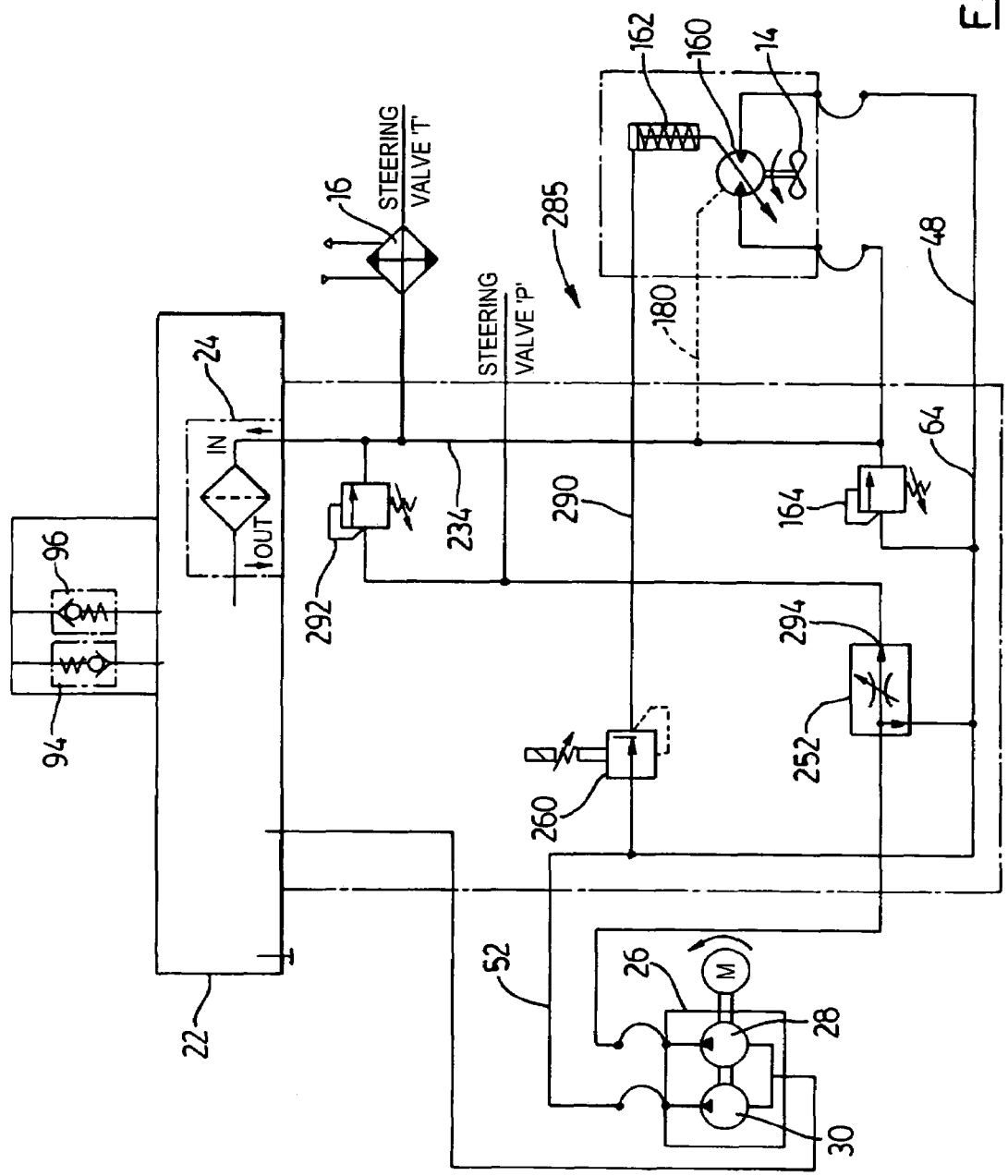
FIG. 11 is a schematic illustration of a further embodiment of a hydraulic circuit according to the invention, this embodiment being connected to a fan motor controlled by a hydraulic displacement control allowing the motor to vary its displacement.

Reference will now be made to the fan drive circuit 285 illustrated in FIG. 11. This electro-hydraulic system is similar to the hydraulic fan drive circuit 250 of FIG. 9, except for the differences noted hereinafter. Again, the same reference numbers are generally used to identify the same or similar features and components. The major difference is the use of a standard variable displacement motor 160. As in the hydraulic circuit 10 of FIG. 1, excess hydraulic fluid flow from pump 28, which can be a larger pump, is combined with flow from the pump 30 to drive the fan motor 160. The output speed and power of the motor 160 can be changed when required by changing its displacement. The motor 160 is controlled by a proportional hydraulic displacement control indicated schematically at 162, which control can be of standard construction and can be an integral component sold with the motor 160. The power required to rotate the fan increases substantially (ie. by the exponent of 3) with the fan speed. The displacement control 162 can be operated via a hydraulic line 290 by the proportional control valve 260 which in turn is controlled by the aforementioned electronic controller 170 described in detail hereinafter.

This hydraulic circuit 285 is also provided with a relief valve 164 connected to the line 64 in the hydraulic circuit block. The valve 164 is provided to protect the components in the hydraulic circuit. The line 180 shown in dash lines that extends from the motor 160 to hydraulic line 234 is a drain line for the motor case. The motor 160 has internal fluid leakage for lubrication and thus leaked hydraulic fluid is drained by the line 180 back to the reservoir.

Also provided in the fan drive circuit 285 is a pressure relief valve 292 having an outlet connected to the line 234. The inlet of this pressure relief valve is connected to the outlet 294 of the priority valve 252. Again, the relief valve 292 protects the power steering system.

The hydraulic line 52 connected to the outlet of the pump 30 delivers output of this pump to the passageway 64 which in turn delivers the output to the inlet of the motor 160. In this hydraulic fan drive system, the hydraulic fluid from the pump 30 is used to flush the fan drive loop, condition the hydraulic fluid and supercharge the two pumps 28 and 30. One advantage of the electro-hydraulic system of FIG. 11 is that it can achieve the highest efficiency under all operating conditions but this system may be more expensive than other systems such as the system of FIG. 1.

Although the proportional control valve 260 of the fan drive circuit 285 is illustrated as being mounted in the manifold block, it is also possible to have this proportional control valve integrated into the variable displacement motor unit. The location of the proportional control valve is not important to the functioning of the overall circuit.

Figure 12:
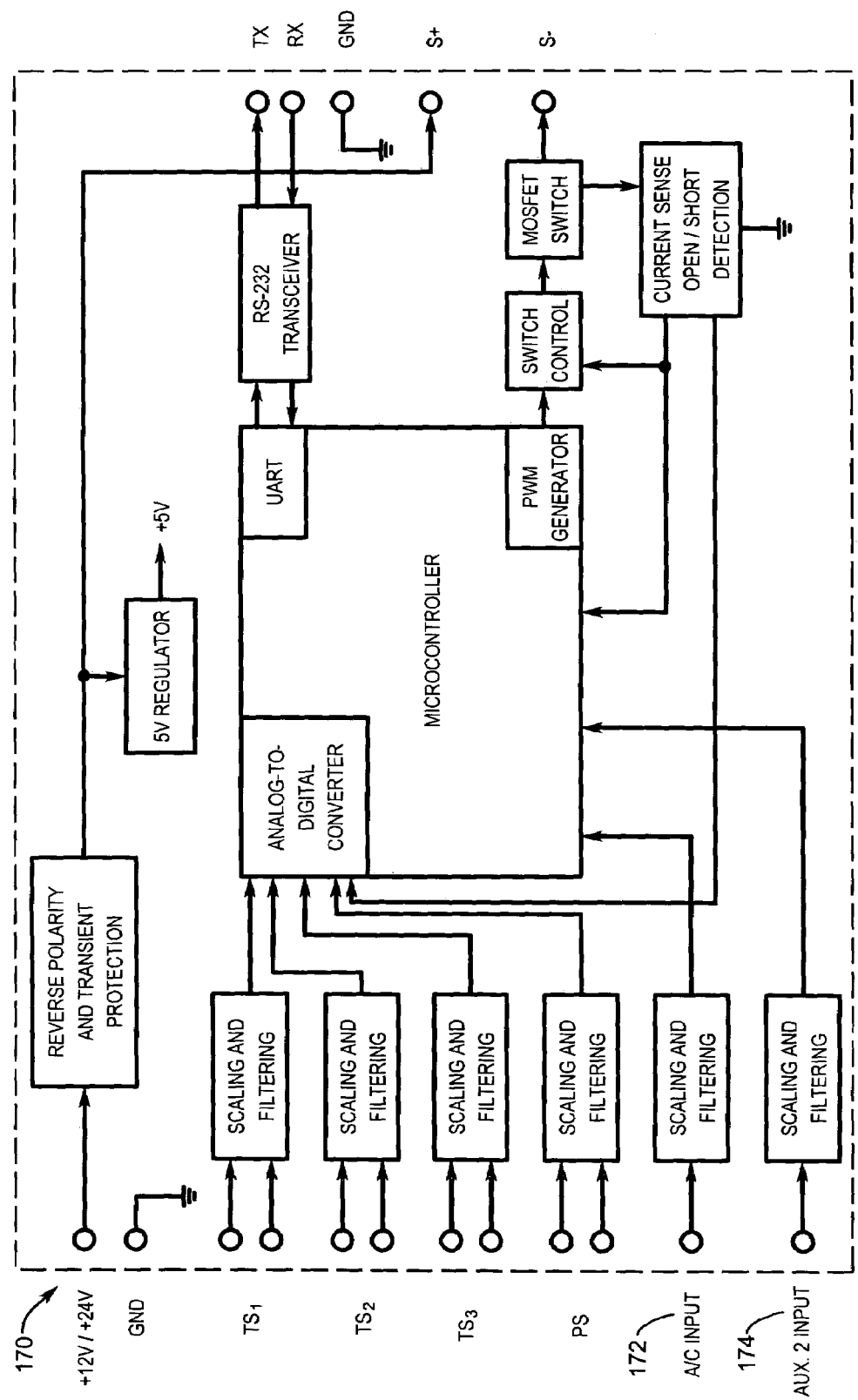
FIG. 12 is a block diagram illustrating the electronic controller for controlling the proportional control valve in a hydraulic circuit of the invention.

A preferred electronic controller hereinafter sometimes referred to as the Fan Drive Controller for controlling and operating the proportional control valve 60 or the solenoid displacement control 162 is illustrated schematically in FIG. 12. This electronic controller is for retrofit use and is indicated generally by reference 170. This controller accepts inputs from three temperature sensors identified as TS1, TS2 and TS3 in FIG. 12 and two auxiliary digital inputs to determine the required solenoid current, these inputs being indicated at 172 and 174. In the case of OEM use, the vehicle's own electronic controller(s) can be modified to control the present electro-hydraulic fan control system.

All connections to the Fan Drive Controller are made through a single connector on a wire pigtail protruding through a single hole in a suitable enclosure provided for the controller. A total of 18 wires are used to connect to the controller. The 18 wires are terminated in a Delphi 22-position female Weather Pack connector. The Weather Pack connector is fully sealed, and is specifically designed for use in harsh environments requiring resistance to temperature extremes, chemicals, and fluids. The 4 unused positions of the connector are sealed using Weather Pack cavity seals.

Connections to the vehicle are made using individual wires inserted into the mating 22-position male Weather Pack connector. Because there are many unique installations, there is no standard wiring harness. Assembling the wires into the male connector on-site permits cutting each wire to the right length for the particular installation. All connections can be made using 20 gauge wire.

The circuitry of the Fan Drive Controller, which is mounted on an electronics circuit board, consists of the following:
  5V power supply regulator, with reverse polarity and transient protection.
  A Microchip PIC16F876A or equivalent microcontroller, including an Analog-to-Digital Converter (ADC), EEPROM for non-volatile data storage, and a PWM signal generator.
  Temperature sensor signal conditioning circuitry for the 3 temperature inputs.
  Auxiliary digital input signal voltage limiting and transient protection circuitry.
  Pressure sensor input circuitry.
  Power output circuitry to drive the solenoid.
  Solenoid fault detection circuitry.
  Battery-backed Real-Time Clock (RTC).
  Power and fault indicator LED.
  Diagnostic and configuration communication interface circuitry.

The Fan Drive Controller provides the following signals on its connector:

| Pin # | Signal |
| --- | --- |
| 1 | Ground (power) |
| 2 | +12 V/+24 V power |
| 3 | Solenoid + |
| 4 | Solenoid − |
| 5 | Ground (for TX/RX) |
| 6 | Serial TX from Controller |
| 7 | Serial RX (to Controller) |
| 8 | Ground (pressure sensor) |
| 9 | +12 V/+24 V out (for pressure sensor) |
| 10 | Pressure sensor input 0 to IOV |
| 11 | Aux2 input |
| 12 | Air-Conditioning input |
| 13 | Coolant temperature sensor + |

-continued

| Pin # | Signal |
|---|---|
| 14 | Coolant temperature sensor – |
| 15 | Hydraulic fluid temperature sensor |
| 16 | Hydraulic fluid temperature sensor – |
| 17 | Ram air temperature sensor + |
| 18 | Ram air temperature sensor – |
| 19 | Unused |
| 20 | Unused |
| 21 | Unused |
| 22 | Unused |

The power supply accepts input from the vehicle's 12V or 24V DC electrical system, and provides regulated 5V power to the microcontroller and other circuitry. Both the power supply and the output power drive circuitry operate with input supply voltages ranging from 9V to 32V DC.

The automotive environment demands a number of power supply protection features. A series diode is used to provide reverse polarity protection for both the 5 V regulator and the power switch circuitry. A Positive Temperature Coefficient (PTC) device provides self-resetting protection against short circuit conditions. A combination of input series resistance, a varistor, and a capacitor protect the 5 V regulator circuitry from input transients, including load dump transients up to 60V.

Note that the Fan Drive Controller is to be powered only when the vehicle ignition is on to avoid excessive current draw when the engine is not running.

The Microchip PIC16F876A microcontroller provides a microprocessor as well as a number of peripherals needed for the operation of the Fan Drive Controller:

A 10-bit Analog-to-Digital Converter (ADC) with a 5-input multiplexer.
A two-channel PWM generator.
A UART (for diagnostic serial communication).
A 256-byte EEPROM for non-volatile data storage.
8192 words of program memory.
368 bytes of RAM.

The microcontroller operates at a clock frequency of 4 MHz, providing an instruction rate of 1 MIP (1 Million Instructions Per second). If necessary, the clock frequency can be raised to 20 MHz for a processing rate of 5 MIPs.

The Fan Drive Controller has three separate temperature sensor inputs. The temperature sensors are type Z negative temperature coefficient thermistors with a nominal resistance value of 10 kOhms at 25° C. Using a 6810 ohm 1% pull-up resistor, the input circuitry measures temperatures from −40° C. to +125° C. with an accuracy of +/−2° C.

The inputs are filtered to minimize the effects of EMI and other electrical noise on measurement accuracy. Each input is connected to a separate ADC input, providing good isolation between sensor inputs.

The two auxiliary inputs provide on/off inputs at the vehicle battery voltage level. A "high" input level is a voltage of 9V to 32V, while a "low" input level is a voltage of less than 0.8V or an open circuit. The software can be configured to treat either "high" or "low" as the active input state.

The pressure sensor is a solid-state device operating from the system battery voltage, and providing a linear 0–10VDC output voltage representing a pressure range of up to 10,000 PSI. The full-scale pressure can be configured for correct display of the pressure in the Diagnostic output.

The valve solenoid operates at a maximum current of 2.5 A in a 12V system, or 1.25 A in a 24V system.

The solenoid output is driven by an N-channel MOSFET with a free-wheeling diode across the solenoid to provide a path for the solenoid coil's inductive current at MOSFET turn-off.

Solenoid current is controlled using PWM modulation of the MOSFET at a frequency of 4.5 KHz with a 150 Hz square wave dither that is configurable between 0% and 10% of the PWM output duty cycle.

To protect the output MOSFET from damage due to over-current, an output current monitoring circuit is used. If the output current exceeds 3.5 A, the MOSFET will immediately be shut off by the over-current detection circuit to prevent damage to the MOSFET. The microcontroller will register a short-circuit fault condition, and will stop driving the MOSFET. The microcontroller will periodically retry driving the MOSFET so that normal operation will be resumed once the short circuit condition is corrected.

The output of the current monitoring circuit is also filtered and fed to one of the inputs of the microcontroller's Analog-to-Digital Converter (ADC), allowing the software to measure the average output current. If the output current is less than 0.15 A while the solenoid is activated, an "open circuit" fault condition will be registered by the microprocessor. The microprocessor will continue to drive the output MOSFET as usual, but a fault condition will be registered in the error log.

The communication interface uses an RS-232 port for connection to a diagnostic or programming terminal to allow viewing diagnostic information, setting configuration parameters, and re-programming the microprocessor.

The communication interface uses standard RS-232 voltage levels, and operates at 9600 baud, with 8 data bits, no parity, and 1 stop bit. Two wires are used to provide Transmit and Receive signals.

The software running on the Microchip PIC16F876A microcontroller performs the following tasks:

Read temperature sensor inputs.
Read auxiliary inputs.
Read pressure sensor input.
Calculate required output PWM duty cycle.
Drive solenoid output, including PWM dither.
Monitor for output fault conditions.
Log fault conditions
Handle serial communication for configuration and diagnostics.

The software is written in C, and compiled using the CC5X compiler from B Knudsen Data.

The NTC thermistor sensors are connected between an on-board pull-up resistor and ground to form a voltage divider. The resulting voltage varies inversely with temperature. The microcontroller's built-in Analog-to-Digital Converter (ADC) is used to convert the sensor voltage to a 10-bit binary value.

Because the thermistor output is non-linear, the ADC reading then has to be linearized. This is done using a look-up table to determine the nearest integer temperature (in degrees Celsius) for each input reading.

Note that the look-up table is specific to a type Z NTC thermistor. Alternative thermistor types may be used by updating the internal controller software.

If the temperature reading is below −45¹° C., the sensor is assumed to be open-circuited and a fault condition is logged.

If a temperature reading is above the configured maximum for the respective sensor, a fault condition is also logged.

The first temperature value that can be measured by TS1 is the temperature of the engine coolant. The second temperature value that can be measured by TS2 is the temperature of the RAM air or charged air, that is the incoming air in the intake manifold for the engine. The third temperature that can be measured and monitored is typically the temperature of the hydraulic fluid itself.

There are two auxiliary inputs to the Fan Drive Controller: Air-Conditioning (AC) and Auxiliary 2 (Aux2).

The Air-Conditioning input is activated when the vehicle's air conditioning system is turned on. When the AC input is active, the output PWM duty cycle is maintained at the configured minimum level (D ACMIN) to ensure a minimal fan speed.

The Aux2 input may be connected to a fire detection sensor in the engine compartment. If fire breaks out in the engine compartment, the fan must be shut off to avoid fanning the flames. Aux2 may also be wired to a "fan defeat" switch to manually disable fan operation. However the second switch input is application specific. For example, it could be a system-enable or system-disable switch providing a safety feature.

Both inputs can be independently configured as "active high" (normally open) or "active low" (normally closed).

The pressure sensor provides a linear voltage output. The ADC reading for the pressure sensor is simply stored for display by the diagnostic interface. The pressure sensor reading is not used to control the output PWM duty cycle.

The three temperature input readings, along with the two auxiliary inputs, are used to determine the required output PWM duty cycle.

For each temperature sensor, the desired output PWM duty cycle is calculated based on the four configuration parameters for each sensor. The four configuration parameters are:

TL Low temperature threshold
DL Low PWM duty cycle threshold
TH High temperature threshold
DH High PWM duty cycle threshold If the temperature is below TL, the desired PWM duty cycle is 0%. If the temperature is above TH, the desired PWM duty cycle is DH. For temperatures between TL and TH, according to one embodiment, the desired duty cycle is calculated using linear interpolation. That is, for temperature T, with TL <=T <=TH, the desired duty cycle is:

$$D=(DH-DL)*(T-TL)/(TH-TL)+DL$$

According to other contemplated embodiments, the duty cycle may be calculated according to other functions of the temperature T and temperature thresholds TL and TH, for example exponential or logarithmic. Alternatively, second order or higher algebraic functions could be used.

The desired duty cycle is calculated separately for each of the three temperature sensor inputs, and the maximum of these three values (DTmax) is used as the actual PWM duty cycle output.

If the Air-Conditioning (AC) input is active, the configured minimum duty cycle (D_ACMIN) is used if it is greater than DTmax.

If the Aux2 input is active, the PWM duty cycle is set to 0% regardless of the temperature readings or the AC input.

The variable duty cycle PWM output is generated by the microcontroller's built-in PWM generator. Setting the duty cycle is accomplished by writing the appropriate scaled value to a control register.

To apply dither to the PWM output, the duty cycle must be continually adjusted. The 150 Hz dither frequency requires the duty cycle to be adjusted at a rate of 300 Hz. This is accomplished by an interrupt handler that is activated 300 times per second. The interrupt handler "toggles" the duty cycle between its low and high values.

The low and high duty cycle values are re-calculated whenever the output duty cycle set point is changed. The amplitude of the dither is set by a configuration parameter (DITHER), which defines the dither amplitude (0% to 10%). The low and high duty cycle values are calculated by subtracting or adding half of the DITHER setting from/to the output PWM duty cycle, respectively.

For example, if DITHER is set to 6% and the current output duty cycle is 40%, the low and high threshold would be 3% (half of 6%) below and above the 40% duty cycle:

$$D\_low=40-3=37\%$$

$$D\_high=40+3=43\%$$

If the dither calculating results in a value of D high that is greater than 100%, D_high is set to 100%.

If 100% output is called for, no dither is applied.

To avoid excessive "chatter", the output duty cycle is updated only once per second. This avoids frequent changes in output PWM duty cycle that might result from noise in input temperature measurements.

In the software program there can be an air conditioning input menu that displays the current settings for the AC input and provides two options to change the settings, namely active (high) or minimum, in which case the output is thirty percent. If one chooses the first or active option, the programmer will then have to chose between making the AC input active high or low, respectively. By pressing the enter key the new value will be saved and the user will return to the AC input configuration menu. If one chooses the second or minimum option, the user will obtain the minimum output PWM duty cycle that is maintained when the AC input is active. Once the user selects this option, he enters a number in the range of zero to one hundred and presses the enter key to record.

The software also has an auxiliary 2 input configuration menu that displays the current setting for the auxiliary 2 input and provides an option to change the setting. The menu line shows whether the auxiliary 2 input is treated as active "high" or active "low" and it will prompt the user to enter either high or low.

The software also can provide a temperature input configuration menu that initially displays the current settings for the three temperature inputs and provides the option to change the settings. The display can have one line for each of the three temperature sensors, for example is, TS1 or engine coolant fluid temperature, TS2 for a temperature such as the RAM air temperature and TS3 for hydraulic fluid temperature. Each line can show the low and high set points for the respective temperature sensor as well as the maximal acceptable temperature for the sensor. Each set point consists of a temperature (in Celsius) and a corresponding output PWM duty cycle (expressed as a percentage fraction). By selecting one of the three temperature options, the user will be offered three set points, namely low, high, and maximum. By choosing one of these options, the user is able to change the low set point, the high set point or the maximum acceptable temperature. If the low or the high option is selected a prompt will appear that will permit the user to chose between changing the set point temperature or changing the output, namely the set point's output PWM duty cycle. If the temperature option is selected the user will enter a number in the range of 0 to 125. If the output option is selected, the user can enter a number ranging from 0 to 100. If the maximum option is selected from the set point menu, the user can enter a number in the range of 0 to 135 after seeing the required prompt.

The software also provides a dither configuration menu which will display the current setting for the amount of dither applied to the PWM output and provides an option to change this amount. By selecting the change option, the user can enter the new number in the range of 0 to 10.

The software can also provide a pressure option in the configuration menu which can display the current setting for the full-scale pressure reading of the pressure sensor and provides an option to change it. By pressing the indicated key for a change, the user is able to enter a new pressure range between 100 and 10,000.

To summarize then, the configuration menu of the software of the electronic controller allows the user to view and change the various parameter values that control the operation of the controller.

The preferred electronic controller should withstand vibration according to industry standards for off-highway vehicle applications and it should also be able to withstand shocks according to these industry standards.

Also, shown in FIG. 1 are a number of flexible hoses 135, the diameter of which is indicated on the figure. These flexible hoses are provided at the inlet ports of the tandem pump, at the outlet ports of this tandem pump, at the inlet and outlet for the fan motor 12 and at the inlet to the cooler unit 16.

It will be seen that the above described electro-hydraulic system is able to provide a more constant RPM of the fan on demand with variable engine RPM. This new system has the advantage of optimizing energy usage, reducing the amount of space and weight required for the fan operating system, and providing an electronic control that allows easy adjustment in the field. Another difficulty that is overcome or reduced by this electro-hydraulic system is one caused by pulsating pressure effects due to thermal energy speed variation which can induce fatigue in the mechanical parts of the hydraulic components. By supercharging the larger pump of the tandem pump with the flow from the smaller pump, the system of FIG. 1 can reduce these pulses and thus increase the working life of the hydraulic system and reduces noise levels.

Another advantage that arises from the described electro-hydraulic system is due to the use of a sealed, pressurized reservoir. This helps to control contamination levels in the hydraulic fluid. Also, the hydraulic system described herein can be designed for use with an existing electronic control for a vehicle engine as well as for use by original equipment manufacturers.

Another advantage that can be obtained by the supercharging of the large pump with filtered hydraulic fluid is that it can reduce the size of the reservoir required. Also, because the reservoir is pressurized and the pressure becomes greater as the system warms up, it becomes possible to eliminate the usual air breather.

It will be readily apparent to those skilled in the design of hydraulic systems and electro-hydraulic systems for vehicles that various modifications and changes can be made to the described electro-hydraulic system without departing from the spirit and scope of this invention. Accordingly, all such modifications and changes are intended to be part of this invention.

We claim:

1. An electro-hydraulic system for operating a hydraulic motor for a vehicle cooling fan and providing pressurized hydraulic fluid to a power steering system of the vehicle, said system comprising:

a hydraulic pump unit including at least first and second fixed displacement pumps and a common drive shaft to drive each of said pumps;

a hydraulic fluid reservoir fluidly connected to at least one inlet of said pumps and capable of providing sufficient hydraulic fluid for operation of said pump unit;

an electro-hydraulic drive circuit adapted for hydraulic fluid connection to said hydraulic motor for operating said cooling fan, said drive circuit including an electro-hydraulic proportional control valve operatively connectible to said pump unit for controlling and limiting the operational speed of said hydraulic motor and further including a priority valve for providing a constant flow of hydraulic fluid to said power steering system, the operation of said priority valve being controlled by hydraulic pressure in said fan drive circuit during use of the electro-hydraulic system, wherein said proportional control valve is adapted for electrical connection to an electronic control device capable of electrically operating and controlling said proportional control valve from predetermined input variable readable by said control device, said variables including at least one temperature variable, said control device being capable of calculating an appropriate cooling fan speed, generating electrical control signals based on said calculation, and transmitting these control signals to said proportional control valve in order to direct said cooling fan towards a more appropriate speed for cooling, and wherein said priority valve is arranged to direct excess flow of hydraulic fluid, if any, from the pump unit so that said excess flow is combined with hydraulic fluid flow from said second pump in order to drive said hydraulic motor and operate said fan.

2. An electro-hydraulic system according to claim 1 wherein said drive circuit includes an unloading valve having an unloading valve inlet operatively connected to a hydraulic line of the drive circuit that is extendible between an outlet of said second pump and said hydraulic motor, said unloading valve also having an unloading valve outlet connectible so as to provide hydraulic fluid flow to an inlet of said pump unit, said unloading valve during use of the system moving to an open position to allow hydraulic fluid from said second pump to flow to the inlet of the pump unit upon receipt of a predetermined amount of hydraulic pressure feedback from said hydraulic motor.

3. An electro-hydraulic system according to claim 1 including said electronic control device which is an electronic controller electrically connected to said proportional control valve.

4. An electro-hydraulic system according to claim 1 wherein said priority valve is arranged in said drive circuit between a first hydraulic fluid passage connectible to an outlet of said hydraulic motor and a second hydraulic fluid passage connected to a return flow inlet of said reservoir.

5. An electro-hydraulic system according to claim 1 wherein said priority valve is arranged in said drive circuit so that the priority valve is operatively connected to said first pump and is connectible to an inlet of said hydraulic motor.

6. An electro-hydraulic system according to claim 3 wherein said fluid reservoir is pressurized during use of the electro-hydraulic system and is provided with a pressure limiting valve.

7. An electro-hydraulic system according to claim 6 including a hydraulic fluid filter arranged in a filter housing, wherein hydraulic fluid returning from said drive circuit is first filtered by said filter and then returned to said fluid reservoir during use of the system.

8. An electro-hydraulic system according to claim 1 wherein said pump unit includes a third fixed displacement pump which in use is driven by said drive shaft and said drive circuit includes a second electro-hydraulic proportional control valve operatively connected to said third pump and said reservoir, wherein said second proportional control valve is also adapted for electrical connection to said electronic control device which is also capable of electrically operating and controlling said second proportional control valve from said predetermined input variables read by said control device.

9. An electro-hydraulic system according to claim 1 wherein said hydraulic motor is a variable displacement motor controlled by a hydraulic displacement control unit which is in turn operated and controlled by said proportional control valve.

10. An electro-hydraulic system according to claim 5 wherein said hydraulic motor is a variable displacement motor controlled by a hydraulic displacement control unit which is in turn operated and controlled by said proportional control valve.

11. An electro-hydraulic system according to claim 2 wherein said fluid reservoir is pressurized during use of the electro-hydraulic system and is provided with a pressure limiting valve and said electro-hydraulic system includes said electronic control device which is an electronic controller electrically connected to said proportional control valve.

12. An electro-hydraulic system for operating a hydraulic motor for a vehicle cooling fan and providing pressurized hydraulic fluid to a power steering system for the vehicle, said electro-hydraulic system comprising:
a hydraulic pump arrangement having at least first and second fixed displacement pumps, each of which has an inlet and an outlet, and a common drive shaft connectible to a power source and connected to drive said pumps;
a hydraulic fluid reservoir fluidly connected to at least one of the inlets of the pumps and capable of providing sufficient hydraulic fluids for operation of said pumps, said fluid reservoir being pressurized during use of the system;
an electro-hydraulic drive circuit for connection both to said hydraulic motor for operating said cooling fan and said power steering system, said drive circuit including an electro-hydraulic proportional control valve operatively connectible to said pump arrangement for controlling and limiting the operational speed of said hydraulic motor and further including a priority valve for providing a constant flow of hydraulic fluid to said power steering system, the operation of said priority valve being controlled by hydraulic pressure in said drive circuit during use of the system,
wherein said proportional control valve is adapted for electrical connection to an electronic control device capable of electrically operating and controlling said proportional control valve from predetermined input variables readable by said control device, said variables including at least one temperature variable, said control device being capable of calculating an appropriate cooling fan speed, generating electrical control signals based on said calculations, and transmitting these control signals to said proportional control valve in order to direct said cooling fan towards a more appropriate speed for cooling, and
wherein, during use of the system, said priority valve is able to combine any excess flow of hydraulic fluid from the pump arrangement over the flow required by the power steering system with hydraulic fluid flow from said second pump in order to drive said hydraulic motor and operate said fan.

13. An electro-hydraulic system according to claim 12 wherein said drive circuit includes an unloading valve having an unloading valve inlet operatively connectible to said outlet of the second pump and an unloading valve outlet operatively connectible to said inlet of said first pump for hydraulic fluid flow therebetween, said unloading valve during use of the system moving to an open position to allow hydraulic fluid from said second pump to flow to the inlet of the first pump upon receipt of a predetermined amount of hydraulic pressure feedback from said hydraulic motor.

14. An electro-hydraulic system according to claim 13 wherein an inlet port of said priority valve is operatively connected to the outlet of said first pump, a first outlet of said priority valve is connectible to said power steering system and a second outlet of said priority valve is connectible to an inlet port of said hydraulic motor.

15. An electro-hydraulic system according to claim 14 wherein said drive circuit includes a pressure relief valve operatively connected to said first outlet of said priority valve and capable of providing hydraulic pressure relief at a selected maximum pressure to protect said power steering system and wherein said fluid reservoir also has a pressure limiting valve.

16. An electro-hydraulic system according to claim 15 wherein an inlet of said proportional control valve is operatively connected to said second outlet of said priority valve and is connectible to said inlet port of said hydraulic motor and an outlet of said proportional control valve is operatively connected to a return flow inlet of the reservoir.

17. An electro-hydraulic system according to claim 16 wherein said drive circuit includes a suction relief valve having an outlet port connected to said fluid reservoir and an inlet operatively connected to the inlet of said first pump, said suction relief valve during use of the system acting to limit hydraulic fluid flow to said first pump.

18. An electro-hydraulic system according to claim 12 including said electronic control device which is an electronic controller electrically connected to said proportional control valve.

19. An electro-hydraulic system according to claim 16 including said electronic control device which is an electronic controller electronically connected to said proportional control valve, wherein said electronic controller includes a power supply regulator, a microcontroller chip that includes an analog-to-digital converter, temperature sensor signal conditioning circuitry for three temperature inputs, auxiliary digital input signal voltage limiting and transient protection circuitry, and power output circuitry.

20. An electro-hydraulic system for operating a vehicle cooling fan and providing pressurized hydraulic fluid to a power steering circuit, said electro-hydraulic system comprising:
a hydraulic pump arrangement having at least first and second fixed displacement pumps, each having a fluid inlet and a fluid outlet, and a drive shaft connectible to a power source and connected to drive said pumps;

a hydraulic fluid reservoir fluidly connected to the inlets of said pumps and capable of containing and providing sufficient hydraulic fluid for operation of said pumps;

an electro-hydraulic drive circuit for hydraulic fluid connection to said pump arrangement, said hydraulic motor, and said power steering circuit, said drive circuit including an electro-hydraulic proportional control valve operatively connected to said second pump for controlling and limiting the operation of said hydraulic motor, and further including a priority valve for providing a constant flow of hydraulic fluid to said power steering circuit, the operation of said priority valve being controlled by hydraulic pressure in said drive circuit during use of said system, said priority valve being arranged in said drive circuit so as to be operatively connected between an outlet of said hydraulic motor and said power steering circuit, wherein said proportional control valve is adapted for electrical connection to an electronic control device capable of electrically operating and controlling said proportional control valve from predetermined input variables readable by said control device, said variables including at least one temperature variable, said control device being capable of calculating an appropriate cooling fan speed, generating electrical control signals based on said calculations, and transmitting these control signals to said proportional control valve in order to direct said cooling fan towards a more appropriate speed for cooling, and wherein, during use of the system, said priority valve returns any excess flow of hydraulic fluid over the flow required by the power steering system to said fluid reservoir.

21. An electro-hydraulic system according to claim 20 wherein said priority valve is arranged in said drive circuit between a first hydraulic fluid passage of said drive circuit connected to an outlet of said hydraulic motor and a second hydraulic fluid passage connectible to said power steering circuit.

22. An electro-hydraulic system according to claim 20 wherein said priority valve has a priority valve inlet and first and second priority valve outlets and is arranged in said drive circuit so that said first priority valve outlet is operatively connectible to said power steering circuit and said second priority valve outlet is connected to said fluid reservoir.

23. An electro-hydraulic system according to claim 21 wherein said fluid reservoir is pressurized during use of the electro-hydraulic system and is provided with a pressure limiting valve and said drive circuit includes a pressure relief valve operatively connected to an outlet of said priority valve and capable of providing hydraulic pressure relief at a selected maximum pressure to protect said power steering circuit.

24. An electro-hydraulic system according to claim 22 wherein said fluid reservoir is pressurized during use of the electro-hydraulic system and is provided with a pressure limiting valve and said drive circuit includes a pressure relief valve operatively connected to said first priority valve outlet and capable of providing hydraulic pressure relief at a selected maximum pressure to protect said power steering circuit.

25. An electro-hydraulic system according to claim 21 including said electronic control device which is an electronic controller electrically connected to said proportional control valve.

26. An electro-hydraulic system according to claim 22 including said electronic control device which is an electronic controller electrically connected to said proportional control valve.

* * * * *